(12) United States Patent
Toya et al.

(10) Patent No.: US 9,710,692 B2
(45) Date of Patent: Jul. 18, 2017

(54) IMAGING DEVICE, AND CONTROLLING METHOD OF IMAGING DEVICE

(71) Applicant: Seiko Epson Corporation, Tokyo (JP)

(72) Inventors: Takashi Toya, Chino (JP); Mitsutoshi Miyasaka, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/145,070

(22) Filed: May 3, 2016

(65) Prior Publication Data

US 2016/0352989 A1 Dec. 1, 2016

(30) Foreign Application Priority Data

May 29, 2015 (JP) .................................. 2015-110232

(51) Int. Cl.
*G06K 9/00* (2006.01)

(52) U.S. Cl.
CPC ................... *G06K 9/0004* (2013.01)

(58) Field of Classification Search
CPC ............ G06K 9/0004; G06K 9/00006; G06K 9/00013; G06K 9/00053; G06K 9/00067; G06K 9/00073; G06K 9/0008; G06K 9/2027; G06K 9/2036; G06K 9/46; G06K 9/4661; G06T 2207/30; G06T 2207/30004;
(Continued)

(56) References Cited

U.S. PATENT DOCUMENTS

| 7,609,864 | B2 * | 10/2009 | Nagasaka | ............ | A61B 5/1172 |
| | | | | | 382/124 |
| 2004/0252867 | A1 * | 12/2004 | Lan | ...................... | G06K 9/0004 |
| | | | | | 382/124 |

(Continued)

FOREIGN PATENT DOCUMENTS

JP 2014-067577 A 4/2014

*Primary Examiner* — Lin Ye
*Assistant Examiner* — Chriss Yoder, III
(74) *Attorney, Agent, or Firm* — Harness, Dickey & Pierce, P.L.C.

(57) ABSTRACT

An imaging device includes: an illumination portion which includes a light-transmitting transmission region and a light-shielding non-transmission region, has a plurality of simultaneous light-emitting elements that have a light-transmitting property, include a plurality of first light-emitting elements in which turning-on and turning-off are simultaneously controlled and a plurality of second light-emitting elements in which turning-on and turning-off are simultaneously controlled, and are provided in the transmission region, and has a plurality of individual light-emitting elements in which turning-on and turning-off are individually controlled and which are provided in the non-transmission region; an imaging portion which receives light that is reflected from a subject illuminated by the illumination portion and is transmitted through the transmission region; and a switching portion which selectively turns on the plurality of first light-emitting elements and the plurality of second light-emitting elements in a first period in which the plurality of individual light-emitting elements are turned off, and turns off the plurality of simultaneous light-emitting elements in a second period in which the plurality of individual light-emitting elements are turned on.

10 Claims, 7 Drawing Sheets

(58) Field of Classification Search
CPC .... G06T 2207/30101; G06T 2207/30104; G01B
11/25–11/2545
See application file for complete search history.

(56) References Cited

U.S. PATENT DOCUMENTS

2012/0256089 A1* 10/2012 Kanda ................. G06K 9/0004
250/338.1
2012/0257031 A1* 10/2012 Tsuchiya ............. G06K 9/0004
348/77
2014/0084405 A1 3/2014 Tsuchiya et al.

* cited by examiner

IMAGING DEVICE, AND CONTROLLING METHOD OF IMAGING DEVICE

BACKGROUND

1. Technical Field

The present invention relates to a technique for imaging a subject.

2. Related Art

Various types of imaging devices for imaging a subject have been proposed. For example, JP-A-2014-67577 discloses a configuration in which a light-receiving element receives light reflected from a subject when the subject is illuminated by a light-emitting element containing an organic EL material, thereby imaging the subject.

However, for example, in a case where a vein pattern of a finger is imaged, a sequential order, in which the entirety of the finger is illuminated and imaged in a first stage and a portion corresponding to a vein pattern specified from the result of the imaging is partially illuminated and imaged in a second stage, is postulated. However, since the light-emitting element emits light in both of the first and second stages, there is a problem in that the deterioration of the light-emitting element proceeds.

SUMMARY

An advantage of some aspects of the invention is that it suppresses the deterioration of a light-emitting element which illuminates a subject to be imaged by an imaging device.

An imaging device according to an aspect of the invention includes: an illumination portion which includes a light-transmitting transmission region and a light-shielding non-transmission region, has a plurality of simultaneous light-emitting elements that have a light-transmitting property, include a plurality of first light-emitting elements in which turning-on and turning-off are simultaneously controlled and a plurality of second light-emitting elements in which turning-on and turning-off are simultaneously controlled, and are provided in the transmission region, and has a plurality of individual light-emitting elements in which turning-on and turning-off are individually controlled and which are provided in the non-transmission region; an imaging portion which receives light that is reflected from a subject illuminated by the illumination portion and is transmitted through the transmission region; and a switching portion which selectively turns on the plurality of first light-emitting elements and the plurality of second light-emitting elements in a first period in which the plurality of individual light-emitting elements are turned off, and turns off the plurality of simultaneous light-emitting elements in a second period in which the plurality of individual light-emitting elements are turned on. In the above-described configuration, turning-on and turning-off are simultaneously controlled in the plurality of first light-emitting elements, turning-on and turning-off are simultaneously controlled in the plurality of second light-emitting elements, and turning-on and turning-off are individually controlled in the plurality of individual light-emitting elements. For example, a variable region of a subject is illuminated by individually turning on or turning off the plurality of individual light-emitting elements, and a fixed region of (for example, the entirety of) the subject is illuminated by selectively turning on one of the plurality of first light-emitting elements and the plurality of second light-emitting elements. Therefore, compared to a configuration in which the plurality of individual light-emitting elements are used to illuminate both the regions, it is possible to suppress the deterioration of the individual light-emitting elements. In addition, since the plurality of first light-emitting elements and the plurality of second light-emitting elements are selectively turned on, for example, compared to a configuration in which only one of the plurality of first light-emitting elements and the plurality of second light-emitting elements are used to illuminate the fixed region of the subject, it is also possible to suppress the deterioration of the simultaneous light-emitting elements. Furthermore, since the plurality of first light-emitting elements and the plurality of second light-emitting elements are formed in the transmission region, compared to a configuration in which the light-emitting elements are formed only in the light-shielding non-transmission region, there is an advantage that it is possible to illuminate a wide range of the subject.

Here, "to selectively turn on the plurality of first light-emitting elements and the plurality of second light-emitting elements" means to turn off the plurality of second light-emitting elements in a case where the plurality of first light-emitting elements are turned on and to turn off the plurality of first light-emitting elements in a case where the plurality of second light-emitting elements are turned on, and the presence or absence of the simultaneous light-emitting elements other than the plurality of first light-emitting elements and the plurality of second light-emitting elements and whether to turn on or off the corresponding light-emitting elements do not need to be considered. For example, a configuration in which the plurality of simultaneous light-emitting elements include the plurality of first light-emitting elements, the plurality of second light-emitting elements, and a plurality of third light-emitting elements is postulated. In this configuration, in a case of focusing on the plurality of first light-emitting elements and the plurality of second light-emitting elements, as long as one of the plurality of first light-emitting elements and the plurality of second light-emitting elements are turned off in a case where the other are turned on, regardless of whether the third light-emitting elements are turned on or off while the first light-emitting elements or the second light-emitting elements are turned on, a requirement that "the plurality of first light-emitting elements and the plurality of second light-emitting elements are selectively turned on" is satisfied.

In the aspect of the invention, the individual light-emitting element may be formed by laminating a first electrode, a light-emitting layer, and a second electrode, and the light-emitting layer and the second electrode may be continuous across the first light-emitting elements and the second light-emitting elements. In this configuration, the light-emitting layer and the second electrode included in the individual light-emitting element are continuous across the first light-emitting elements and the second light-emitting elements. Therefore, compared to a configuration in which the light-emitting layer or the second electrode is individually formed for each of the individual light-emitting element, the first light-emitting element, and the second light-emitting element, the configuration of the illumination portion can be simplified.

In the aspect of the invention, the plurality of first light-emitting elements may be divided into a plurality of first light-emitting element columns which are arranged in a first direction and each include two or more first light-emitting elements, the plurality of second light-emitting elements may be divided into a plurality of second light-emitting element columns which are arranged in the first direction and each include two or more second light-emitting elements, and the plurality of first light-emitting element columns and the plurality of second light-emitting element columns may be periodically arranged in a second direction that intersects the first direction. According to this configuration, the plurality of first light-emitting element columns in which the two or more first light-emitting elements are arranged in the first direction and the plurality of second light-emitting element columns in which the two or more second light-emitting elements are arranged in the first direction are periodically arranged in a second direction. Therefore, compared to a configuration in which at least one of the plurality of first light-emitting elements and the plurality of second light-emitting elements are present only in a specific region, it is possible to uniformly illuminate a wide range of the subject.

In the aspect of the invention, each of the plurality of first light-emitting element columns and each of the plurality of second light-emitting element columns may be alternately arranged along the second direction. In this configuration, since the first light-emitting element columns and the second light-emitting element columns are alternately arranged in the second direction, the above-described effect of uniformly illuminating a wide range of the subject is significantly exhibited.

In the aspect of the invention, each of the plurality of individual light-emitting elements may be disposed between a first wire, to which a first voltage is supplied, and a second wire, to which a second voltage different from the first voltage is supplied, each of the plurality of first light-emitting elements may be disposed between the second wire and a third wire, each of the plurality of second light-emitting elements may be disposed between the second wire and a fourth wire, the switching portion may supply the first voltage to one of the third wire and the fourth wire and may supply the second voltage to the other of the third wire and the fourth wire in the first period, and may supply the second voltage to the third wire and the fourth wire in the second period. In this configuration, the first voltage and the second voltage used to control the plurality of individual light-emitting elements are also used to control the plurality of first light-emitting elements and the plurality of second light-emitting elements. Therefore, compared to a configuration in which the first light-emitting elements and the second light-emitting elements are controlled by a voltage that is different from the voltage for controlling the individual light-emitting elements, there is an advantage that the configurations of the circuit that generates a voltage and the wire that supplies the voltage to each of corresponding elements are simplified. In addition, turning-on and turning-off of the plurality of first light-emitting elements are simultaneously controlled by controlling the voltage of the third wire, and turning-on and turning-off of the plurality of second light-emitting elements are simultaneously controlled by controlling the voltage of the fourth wire. Therefore, for example, compared to a configuration in which the plurality of first light-emitting elements are respectively connected to individual wires or a configuration in which the plurality of second light-emitting elements are respectively connected to individual wires, there is an advantage that the plurality of first light-emitting elements and the plurality of second light-emitting elements can be simultaneously controlled with a simpler configuration.

In the aspect of the invention, a transistor, which controls current to be supplied to the individual light-emitting element, and the individual light-emitting element may be connected in series between the first wire and the second wire, each of the plurality of first light-emitting elements maybe connected to the second wire and the third wire, and each of the plurality of second light-emitting elements may be connected to the second wire and the fourth wire. In this configuration, turning-on and turning-off of the individual light-emitting elements are individually controlled by controlling the voltage of the gate of the transistor, the plurality of first light-emitting elements are simultaneously controlled according to the voltage of the third wire, and the plurality of second light-emitting elements are simultaneously controlled according to the voltage of the fourth wire.

An imaging device according to another aspect of the invention is controlled by a control method described below. A control method according to another aspect of the invention is a controlling method of an imaging device, in which the imaging device includes an illumination portion which includes a light-transmitting transmission region and a light-shielding non-transmission region, has a plurality of simultaneous light-emitting elements that have a light-transmitting property, include a plurality of first light-emitting elements in which turning-on and turning-off are simultaneously controlled and a plurality of second light-emitting elements in which turning-on and turning-off are simultaneously controlled, and are provided in the transmission region, and has a plurality of individual light-emitting elements in which turning-on and turning-off are individually controlled and which are provided in the non-transmission region, and an imaging portion which receives light that is reflected from a subject illuminated by the illumination portion and is transmitted through the transmission region, and the method includes selectively turning on either the plurality of first light-emitting elements or the plurality of second light-emitting elements in a first period in which the plurality of individual light-emitting elements are turned off, and turning off the plurality of simultaneous light-emitting elements in a second period in which the plurality of individual light-emitting elements are turned on. In this method, the light-transmitting first and second light-emitting elements are provided in the transmission region, and light from the subject illuminated by the individual light-emitting elements is transmitted through the plurality of first light-emitting elements and the plurality of second light-emitting elements and reaches a light-receiving element in the second period in which the plurality of individual light-emitting elements are turned on. Therefore, compared to a configuration in which the plurality of first light-emitting elements and the plurality of second light-emitting elements have a light-shielding property or a configuration in which the plurality of first light-emitting elements and the plurality of second light-emitting elements are provided in the non-transmission region, there is an advantage that the amount of light that reaches the imaging portion in the second period can be sufficiently ensured.

According to the aspect of the invention, in the controlling method, a unit period including the first period and the second period may be repeated a plurality of times, and the plurality of first light-emitting elements may be turned on in the first period of one unit period of two successive unit periods, and the plurality of second light-emitting elements are turned on in the first period of the other unit period. According to this method, the unit period including the first period and the second period is repeated a plurality of times, the plurality of first light-emitting elements are turned on in the first period of one unit period of two successive unit periods, and the plurality of second light-emitting elements are turned on in the first period of the other unit period. Therefore, compared to a configuration in which only the plurality of first light-emitting elements (the plurality of second light-emitting elements) are continuously turned on in each of the unit periods, it is possible to suppress the deterioration of the light-emitting elements.

In the controlling method according to the aspect of the invention, in the second period, one or more individual light-emitting elements selected from among the plurality of individual light-emitting elements according to the result of the imaging by the imaging portion in the first period may be turned on, and the remaining individual light-emitting elements may be turned off. According to this method, since the one or more individual light-emitting elements selected according to the result of the imaging in the first period are turned on and the remaining individual light-emitting elements are turned off, it is possible to image the subject in the second period with a high S/N ratio.

In the controlling method according to the aspect of the invention, the imaging portion may include a plurality of light-receiving elements which overlap the transmission region in a plan view, and in the first period in which the plurality of first light-emitting elements are turned on, light received by the light-receiving elements respectively corresponding to the plurality of second light-emitting elements may be regarded as valid and light received by the light-receiving elements respectively corresponding to the plurality of first light-emitting elements may be regarded as not valid, and in the first period in which the plurality of second light-emitting elements are turned on, light received by the light-receiving elements respectively corresponding to the plurality of first light-emitting elements may be regarded as valid and light received by the light-receiving elements respectively corresponding to the plurality of second light-emitting elements may be regarded as not valid. In this method, in the first period in which the plurality of first light-emitting elements are turned on, light received by the light-receiving elements that overlap the transmission region corresponding to the first light-emitting elements is regarded as not valid, and the light-receiving elements that overlap the transmission region corresponding to the second light-emitting elements are regarded as valid. In addition, in the first period in which the plurality of second light-emitting elements are turned on, light received by the light-receiving elements that overlap the transmission region corresponding to the second light-emitting elements is regarded as not valid, and the light-receiving elements that overlap the transmission region corresponding to the first light-emitting elements are regarded as valid. Therefore, there is an advantage that the effect (for example, saturation of the charge quantity that occurs in the light-receiving elements) of the light emitted from the first light-emitting elements (the second light-emitting elements) toward the imaging portion side can be suppressed. In addition, "being not valid" for the light received by the light-receiving element means that the light received by the corresponding light-receiving element is not reflected in the result of the imaging. For example, not outputting a detection signal from the corresponding light-receiving element or discarding or ignoring the detection signal output from the corresponding light-receiving element is implicit in the meaning of "being not valid" for the light received by the light-receiving element.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

Figure 1:
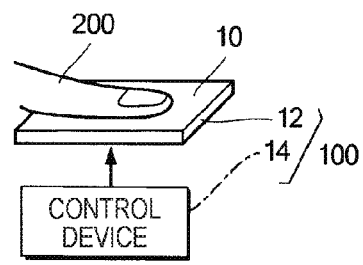
FIG. 1 is a schematic view of a biological information generation device according to an embodiment of the invention.

FIG. 1 is a schematic view of a biological information generation device 100 to which an imaging device 12 according to a preferred embodiment of the invention is applied. The biological information generation device 100 is a measurement device that images a subject 200 such as a finger of an object to be tested and measures biological information (for example, an oxygen saturation degree or blood sugar level) according to the result of the imaging, and includes the imaging device 12 and a control device 14. The imaging device 12 is a device that images the subject 200, and the control device 14 controls operations of the imaging device 12 and generates biological information. For example, the control device 14 is implemented as a central processing unit (CPU) that executes operations of controlling the imaging device 12 and generating biological information by executing programs stored in a storage device (not illustrated).

Figure 2:
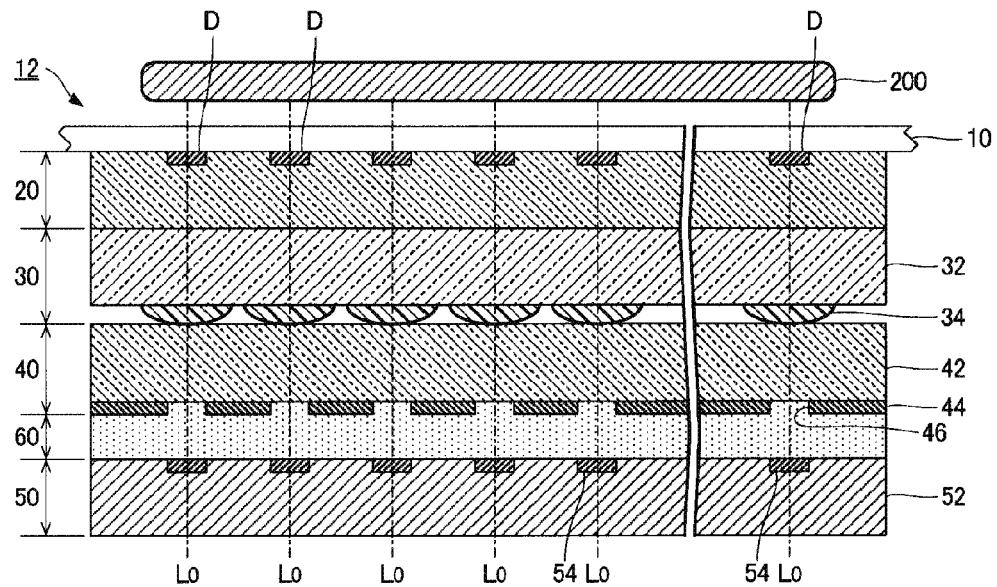
FIG. 2 is a sectional view of an imaging device.

FIG. 2 is a sectional view of the imaging device 12. As illustrated in FIG. 2, the imaging device 12 is configured to include a protective plate 10, an illumination portion 20, a converging portion 30, a light-shielding portion 40, and an imaging portion 50. The protective plate 10 is a light-transmitting plate-like member (cover glass) having a surface on which the subject 200 is placed. The illumination portion 20 is provided between the protective plate 10 and the imaging portion 50. In addition, the converging portion 30 is provided between the illumination portion 20 and the imaging portion 50, and the light-shielding portion 40 is provided between the converging portion 30 and the imaging portion 50. The light-shielding portion 40 and the imaging portion 50 are bonded to each other using an adhesive 60.

The illumination portion 20 is a light source which emits light (hereinafter, referred to as "illumination light") having a specific wavelength, illuminates the subject 200, and transmits light (hereinafter, referred to as imaging light) reflected from the subject 200 illuminated with the illumination light, and includes a plurality of light-emitting elements D which emit the illumination light. The illumination portion 20 of this embodiment illuminates the subject 200 with, as the illumination light, near-infrared light (with a wavelength of 700 nm or higher and 900 nm or lower) which is transmitted through a biological tissue of the subject 200 and is absorbed by reduced hemoglobin in the blood in a vein.

Figure 3:
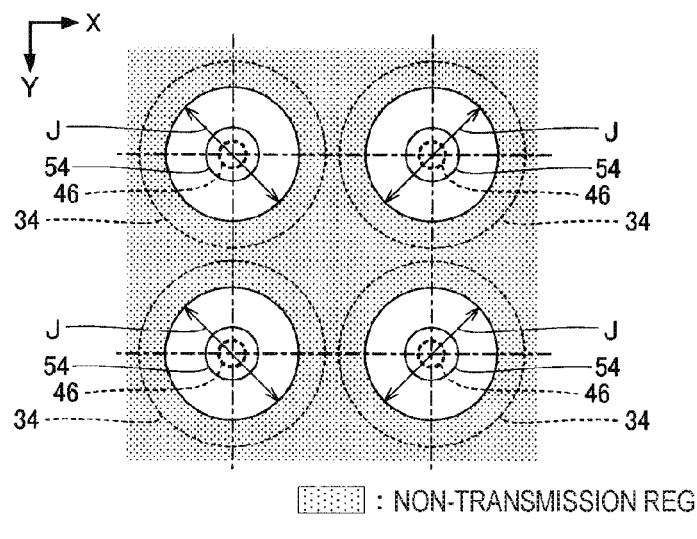
FIG. 3 is a plan view of an illumination portion.

FIG. 3 is a plan view of the illumination portion 20. As illustrated in FIG. 3, the illumination portion 20 is divided into a plurality of transmission regions J and non-transmission regions P in a plan view. Each of the plurality of transmission regions J is a substantially circular region which transmits the imaging light reflected from the subject 200 toward the converging portion 30. As illustrated in FIG. 3, the plurality of transmission regions J are arranged in a matrix along an X direction and a Y direction, which intersect each other. The non-transmission region P is a region which is disposed in the interval between the transmission regions J and does not transmit the imaging light reflected from the subject 200.

The converging portion 30 of FIG. 2 is an element that converges the imaging light reflected from the subject 200, and is configured to include a substrate 32 and a plurality of lenses (microlenses) 34. The substrate 32 is a light-transmitting plate-like member (for example, a glass substrate or a quartz substrate). The plurality of lenses 34 are formed on the surface of the substrate 32 on the opposite side to the illumination portion 20. Each of the lenses 34 is a convex lens that converges the imaging light that is transmitted through the illumination portion 20 and the substrate 32 and is reflected from the subject 200. As understood from FIGS. 2 and 3, a single lens 34 of the converging portion 30 overlaps a single transmission region J in the plan view. Specifically, an optical axis LO of an arbitrary lens 34 passes through the center of the transmission region J corresponding to the lens 34.

The light-shielding portion 40 of FIG. 2 is an element that shields stray light other than the imaging light converged by each of the lenses 34 of the converging portion 30, and is configured to include a substrate 42 and a light-shielding layer 44. The substrate 42 is a light-transmitting plate-like member (for example, a glass substrate or a quartz substrate). The light-shielding layer 44 is a film-like body having a light-shielding property (a property of absorbing or reflecting the imaging light), which is formed on the surface of the substrate 42 that faces the imaging portion 50. The light-shielding layer 44 is formed of, for example, a resin material in which a black colorant (black pigment) such as carbon black is dispersed, or a light-shielding metal material such as chromium. A plurality of openings 46 are formed in the light-shielding layer 44. As understood from FIGS. 2 and 3, each of the openings 46 of the light-shielding layer 44 overlaps a single transmission region J and a single lens 34 in the plan view. Specifically, the optical axis L0 of a single lens 34 passes through the center of the opening 46 corresponding to the lens 34.

The imaging portion 50 is an element that images the subject 200 by receiving the imaging light and is configured to include a substrate 52 and a plurality of light-receiving elements 54. The substrate 52 is, for example, a plate-like member formed of a semiconductor material. The plurality of light-receiving elements 54 are formed on the surface of the substrate 52 on the subject 200 side, and as illustrated in FIG. 3, are arranged in a matrix along the X direction and the Y direction, which intersect each other, in the plan view (when viewed in a direction perpendicular to the substrate 52). Each of the light-receiving elements 54 generates a detection signal according to the amount of imaging light being received. For example, a well-known complementary metal oxide semiconductor (CMOS) sensor or a charge coupled device (CCD) sensor is appropriately employed as the imaging portion 50. As understood from FIGS. 2 and 3, an arbitrary light-receiving element 54 overlaps a single transmission region J, a single lens 34, and a single opening 46 in the plan view. Specifically, the optical axis LO of a single lens 34 passes through the center of the light-receiving element 54 corresponding to the lens 34.

Figure 4:
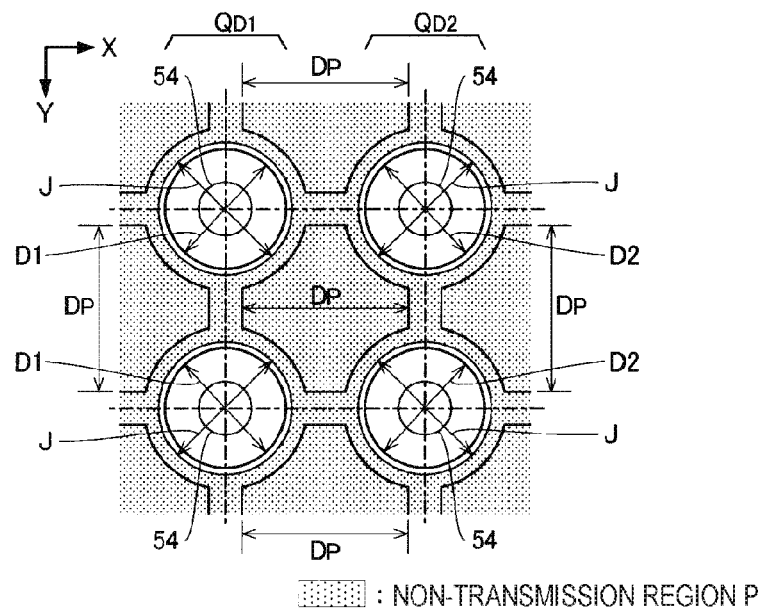
FIG. 4 is a plan view of the illumination portion mainly illustrating a light-emitting element.

FIG. 4 is a plan view of the illumination portion 20 mainly illustrating the light-emitting element D that emits the illumination light. The light-emitting element D of the illumination portion 20 is divided into a light-emitting element D1, a light-emitting element D2, and a light-emitting element DP. As illustrated in FIG. 4, in the non-transmission region P, a plurality of light-emitting elements DP are arranged in a matrix along the X direction and the Y direction. On the other hand, in each of the plurality of transmission regions J, the light-emitting element D1 or the light-emitting element D2 is disposed. The light-emitting elements DP, the light-emitting elements D1, and the light-emitting elements D2 function as light sources that emit the illumination light to the subject 200. In addition, the light-emitting elements D1 and the light-emitting elements D2 provided in the transmission region J transmit the imaging light reflected from the subject 200 illuminated by the light-emitting element DP toward the imaging portion 50 side. As illustrated in FIG. 4, the light-emitting element D1 is disposed in each of the transmission regions J in odd-numbered columns among the plurality of transmission regions J arranged in a matrix along the X direction and the Y direction, and the light-emitting element D2 is disposed in each of the transmission regions J in even-numbered columns. That is, the plurality of light-emitting elements D1 are divided into a plurality of light-emitting element columns QD1 (first light-emitting element columns) which each include two or more light-emitting elements D1 arranged along the Y direction (first direction), and the plurality of light-emitting elements D2 are divided into a plurality of light-emitting element columns QD2 (second light-emitting element columns) which each include two or more light-emitting elements D2 arranged along the Y direction. The plurality of light-emitting element columns QD1 and the plurality of light-emitting element columns QD2 are periodically arranged along the X direction (second direction) intersecting the Y direction. In this embodiment, the plurality of light-emitting element columns QD1 and the plurality of light-emitting element columns QD2 are alternately arranged along the X direction.

Figure 5:
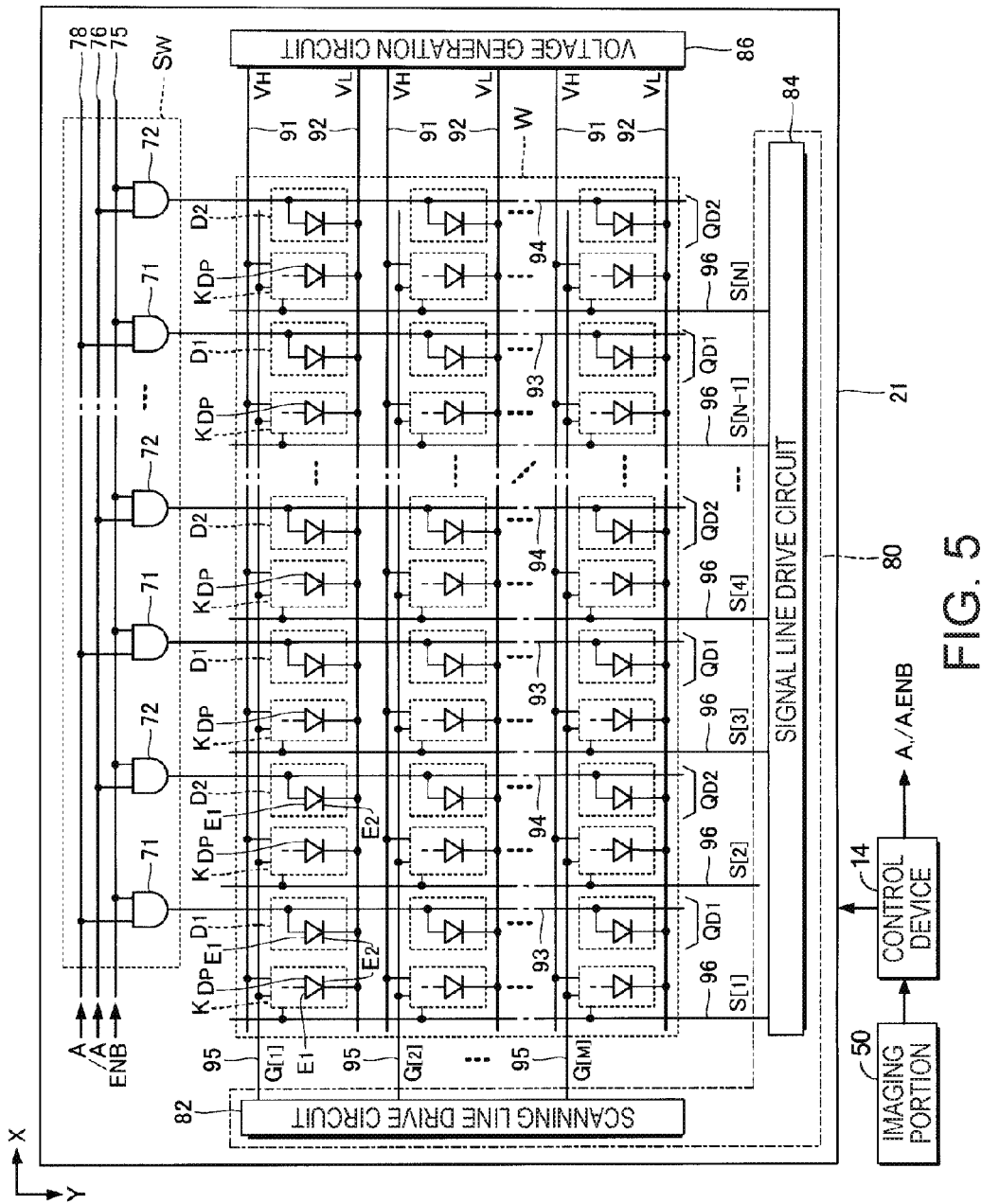
FIG. 5 is an electrical configuration diagram of the illumination portion.

FIG. 5 is an electrical configuration diagram of the illumination portion 20. The illumination portion 20 has a structure in which a light-emitting element section W, a drive circuit 80, a voltage generation circuit 86, and a switching portion SW are provided on the surface of a light-transmitting substrate 21. The voltage generation circuit 86 generates a voltage VH and a voltage VL. The voltage VH is higher than the voltage VL.

In the light-emitting element section W, M scanning lines 95 which extend in the X direction, and N signal lines 96 which extend in the Y direction are formed (M and N are natural numbers). At positions corresponding to the intersections between the scanning lines 95 and the signal lines 96, unit circuits K including the light-emitting elements DP are provided. That is, in the light-emitting element section W, a plurality of unit circuits K are arranged in a matrix with M rows in a vertical direction and N columns in a horizontal direction. To each of the plurality of unit circuits K, the voltage VH having a higher level is supplied from the voltage generation circuit 86 via a wire 91 (first wire), and the voltage VL having a lower level is supplied from the voltage generation circuit 86 via a wire 92 (second wire).

The drive circuit 80 is configured to include a scanning line drive circuit 82 and a signal line drive circuit 84. The scanning line drive circuit 82 sequentially selects the scanning lines 95 by respectively supplying scanning signals G[m] (m=1 to M) to the M scanning lines 95. The signal line drive circuit 84 supplies drive signals S[n] (n=1 to N) to the N signal lines 96. The drive signal S[n] is set to any of the voltage VH and the voltage VL.

Figure 6:
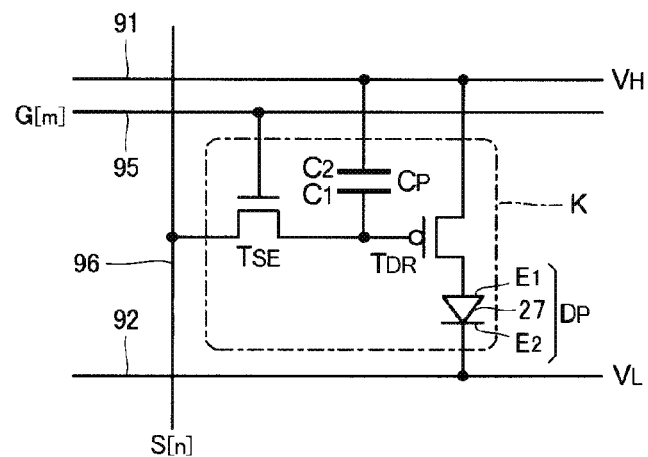
FIG. 6 is a circuit diagram of a unit circuit.

FIG. 6 is a circuit diagram of a single unit circuit K positioned in the m-th row and n-th column in the light-emitting element section W. As illustrated in FIG. 6, the unit circuit K includes a transistor TSE, a transistor TDR, a storage capacitor CP, and the light-emitting element DP. The light-emitting element DP is an organic EL element in which a light-emitting layer 27 made of an organic EL material is interposed between a first electrode (cathode) E1 and a second electrode (anode) E2. The transistor TDR and the light-emitting element DP are connected in series between the wires 91 and 92. Specifically, the transistor TDR is connected between the first electrode E1 of the light-emitting element DP and the wire 91, and the second electrode E2 of the light-emitting element DP is connected to the wire 92. The transistor TDR is a p-channel thin film transistor which controls current supplied to the light-emitting element DP according to the voltage of the gate. As understood from the above description, each of the light-emitting elements DP is disposed between the wire 91 to which the voltage VH (first voltage) and the wire 92 to which the voltage VL (second voltage) is supplied, and the transistor TDR and the light-emitting element DP which control the current supplied to the light-emitting element DP are connected in series between the wire 91 and the wire 92. The storage capacitor CP is a capacitor element including a first electrode C1 and a second electrode C2. The first electrode C1 is connected to the gate of the transistor TDR, and the second electrode C2 is connected to the wire 91.

The transistor TSE functions as a switch that is interposed between the signal line 96 in the n-th column and the gate of the transistor TDR and controls electrical connection (conduction/non-conduction) between the two. The transistor TSE of this embodiment is an N-channel thin film transistor. The gate of the transistor TSE is connected to the scanning line 95 in the m-th row. As understood from the above description, by controlling the voltage of the gate of the transistor TDR according to the voltage of the signal line 96 when the transistor TSE is in an ON state, turning-on and turning-off are separately controlled for each of the light-emitting elements DP. In addition, the conduction types of the transistor TSE and the transistor TDR are arbitrary.

As illustrated in FIG. 5, the plurality of light-emitting elements D1 and the plurality of light-emitting elements D2 are arranged in the light-emitting element section W. As in the light-emitting element DP, the light-emitting elements D1 and the light-emitting elements D2 have a laminated structure in which the light-emitting layer 27 is interposed between the first electrode E1 (anode) and the second electrode E2 (cathode).

As illustrated in FIG. 5, in the light-emitting element section W, a plurality of wires 93 (third wires) corresponding to the different light-emitting element columns QD1 and a plurality of wires 94 (fourth wires) corresponding to the different light-emitting element columns QD2 are formed. The wires 93 and 94 extend in the Y direction. The first electrodes E1 of the M light-emitting elements D1 of an arbitrary light-emitting element column QD1 are simultaneously connected to the wire 93 corresponding to the light-emitting element column QD1. Similarly, the first electrodes E1 of the M light-emitting elements D2 of an arbitrary light-emitting element column QD2 are simultaneously connected to the wire 94 corresponding to the light-emitting element column QD2. In addition, the second electrodes E2 of the light-emitting elements D1 and the second electrodes E2 of the light-emitting elements D2 are simultaneously connected to the wires 92. As understood from the above description, each of the light-emitting elements D1 is disposed between the wire 92 and the wire 93, and each of the light-emitting elements D2 is disposed between the wire 92 and the wire 94.

The switching portion SW in FIG. 5 is an element for selectively turning on the plurality of light-emitting elements D1 and the plurality of light-emitting elements D2, and includes a plurality of AND circuits 71 corresponding to the different light-emitting element columns QD1, a plurality of AND circuits 72 corresponding to the different light-emitting element columns QD2, and a plurality of wires (75, 76, and 78). A control signal A is supplied to the wire 78 from the control device 14, and a control signal /A is supplied to the wire 76 from the control device 14. The control signal /A has a relationship of inversion to the logic level of the control signal A. An enable signal ENB is supplied to the wire 75 from the control device 14. The control signal A and the control signal /A are signals for selectively turning on the light-emitting element D1 and the light-emitting element D2, and the enable signal ENB is a signal for controlling permission/prohibition of light-emission of the light-emitting element D1 or the light-emitting element D2.

First input ends of the plurality of AND circuits 71 are simultaneously connected to the wire 78, and second input ends thereof are connected to the wire 75. Similarly, first input ends of the plurality of AND circuits 72 are simultaneously connected to the wire 76, and second input ends thereof are connected to the wire 75. An output end of each of the AND circuits 71 is connected to a single wire 93, and an output end of each of the AND circuits 72 is connected to a single wire 94. In the above-described configuration, each of the AND circuits 71 outputs the logic signal of the control signal A of the wire 78 and the enable signal ENB of the wire 75 to the wire 93, and each of the AND circuits 72 outputs the logic signal of the control signal /A of the wire 76 and the enable signal ENB of the wire 75 to the wire 94. An output signal from each of the AND circuits 71 and 72 is set to any of the voltage VH and the voltage VL.

Figure 7:
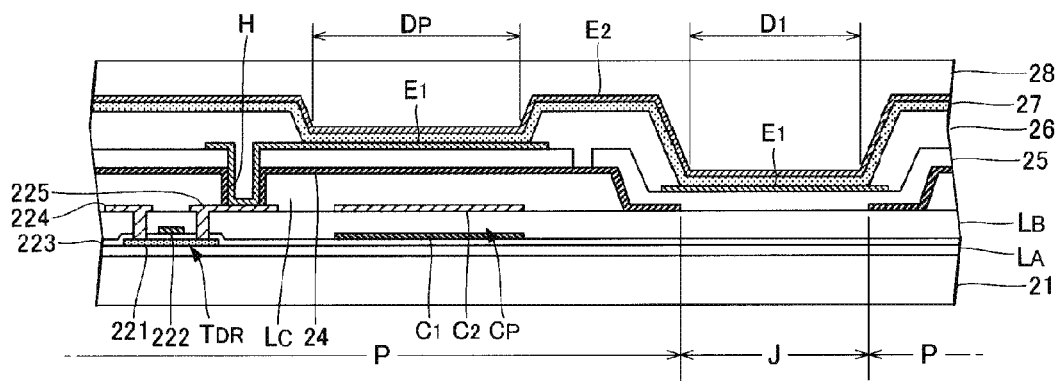
FIG. 7 is a sectional view of the illumination portion.

FIG. 7 is a sectional view of the illumination portion 20. In FIG. 7, the section of the transmission region J and the non-transmission region P is illustrated. As illustrated in FIG. 7, an insulating layer LA is formed on the surface of the substrate 21 which is formed of a light-transmitting plate-like member such as glass or quartz. In the following description, a configuration in which each element in FIG. 7 is formed in a single layer is illustrated. However, it is also possible to form each element in a laminate with a plurality of layers.

The transistor TDR and the storage capacitor CP of each of the unit circuits K are formed on the surface of the insulating layer LA. The transistor TDR includes a semiconductor layer 221, a gate 222, and an insulating film 223 provided therebetween. An insulating layer LB that covers the insulating film 223 is formed over both of the transmission region J and the non-transmission region P, and a wire 224 and a wire 225 are formed on the surface of the insulating layer LB. The wire 224 and the wire 225 are electrically connected to the semiconductor layer 221 via a conduction hole that penetrates through the insulating film 223 and the insulating layer LB. The wire 224 corresponds to the source of the transistor TDR, and the wire 225 corresponds to the drain of the transistor TDR. The storage capacitor CP is configured to have a laminate structure in which the insulating layer LB that functions as a dielectric is interposed between the first electrode C1 in the same layer as that of the gate 222 and the second electrode C2 in the same layer as that of the wires 224 and 225. In addition, the transistor TSE (not illustrated in FIG. 7) of each of the unit circuits K is formed to have the same laminate structure as that of the transistor TDR.

The insulating layer LC is a planarization layer for planarizing stepped portions on the insulating layer LB formed due to the transistor TDR or the storage capacitor CP, and is formed of, for example, a light-transmitting resin material in the non-transmission region P. A reflective layer 24 is formed on the surface of the insulating layer LC. The reflective layer 24 is a thin film formed of a light-reflecting material (for example, aluminum or titanium). A region in which light-shielding (including light-reflecting) elements such as the reflective layer 24, the wire 224, the wire 225, the gate 222, the first electrode C1, the second electrode C2, and the semiconductor layer 221 are formed corresponds to the non-transmission region P, and a region in which only light-transmitting elements are present corresponds to the transmission region J. An optical path adjustment layer 25 is formed on the surfaces of the insulating layers LB and LC over both of the transmission region J and the non-transmission region P. The optical path adjustment layer 25 is a laminate (dielectric mirror) of a plurality of light-transmitting film-like bodies, and is used to adjust the length of an optical path.

The first electrode E1 corresponding to each of the light-emitting elements D (DP, D1, and D2) is formed on the surface of the optical path adjustment layer 25. The first electrode E1 is formed of a light-transmitting conductive material such as indium tin oxide (ITO). The first electrode E1 of the light-emitting element DP is connected to the wire 225 of the transistor TDR via a conduction hole H that penetrates through the optical path adjustment layer 25 and the insulating layer LC. As described above with reference to FIG. 5, in this embodiment, even in the transmission region J, the first electrode E1 of each of the light-emitting elements D1 and the light-emitting elements D2 are formed together with the light-emitting element DP.

A partition layer 26 is formed on the surface of the optical path adjustment layer 25 on which the first electrode E1 is formed. The partition layer 26 is an insulating structure which partitions the space on the surface of the optical path adjustment layer 25 into the light-emitting elements DP, the light-emitting elements D1, and the light-emitting elements D2. The light-emitting layer 27 made of the organic EL material is formed on the surface of the optical path adjustment layer 25 on which the first electrode E1 and the partition layer 26 are formed. The light-emitting layer 27 of this embodiment is formed to be continuous over the entire region of the substrate 21 (that is, both of the transmission region J and the non-transmission region P), for example, by a printing technique such as spin coating. In addition, it is also possible to laminate a hole transport layer or an electron transport layer for increasing the light-emission efficiency of the light-emitting layer 27 on the light-emitting layer 27. In addition, the second electrode E2 is formed to cover the light-emitting layer 27. The second electrode E2 is a semi-transmissive and reflective thin film that is continuous over the entire region of the substrate 21. A light-transmitting sealing layer 28 for preventing the infiltration of the outside air or moisture is formed on the surface of the second electrode E2.

As illustrated in FIG. 7, in the space partitioned by the partition layer 26 in the non-transmission region P, a laminate of the first electrode E1, the light-emitting layer 27, and the second electrode E2 functions as the light-emitting element DP. Light emitted by the light-emitting element DP reciprocates between the second electrode E2 and the reflective layer 24, and a portion of the light is transmitted through the second electrode E2 and is emitted toward the subject 200 side. That is, a resonance structure which selectively emits light having a specific resonant wavelength (illumination light) is formed between the second electrode E2 and the reflective layer 24. In this embodiment, the refractive index and thickness of each layer of the optical path adjustment layer are selected to allow the resonant wavelength of the resonance structure to be a wavelength corresponding to near-infrared light.

On the other hand, in the space partitioned by the partition layer 26 in the transmission region J, a laminate of the first electrode E1, the light-emitting layer 27, and the second electrode E2 functions as the light-emitting element D1 or D2. Therefore, the light-emitting elements D1 and the light-emitting elements D2 have light-transmitting properties. In FIG. 7, only the light-emitting element D1 is illustrated for convenience, and illustration of the light-emitting element D2 is omitted. The light-emitting elements DP, the light-emitting elements D1, and the light-emitting elements D2 have the same laminate structure (the first electrode E1/the light-emitting layer 27/the second electrode E2) and are formed in a common manufacturing process. Therefore, there is an advantage that the light-emitting elements DP, the light-emitting elements D1, and the light-emitting elements D2 can be formed without an increase in the number of manufacturing processes. In addition, as understood from FIG. 7, the light-emitting layer 27 and the second electrode E2 are continuous over the light-emitting elements DP, the light-emitting elements D1, and the light-emitting elements D2. Therefore, for example, compared to a configuration in which the light-emitting layers 27 and the second electrode E2 are separately formed for each of the light-emitting elements DP, the light-emitting elements D1, and the light-emitting elements D2, the constituent elements of the light-emitting elements can be simplified.

Figure 8:
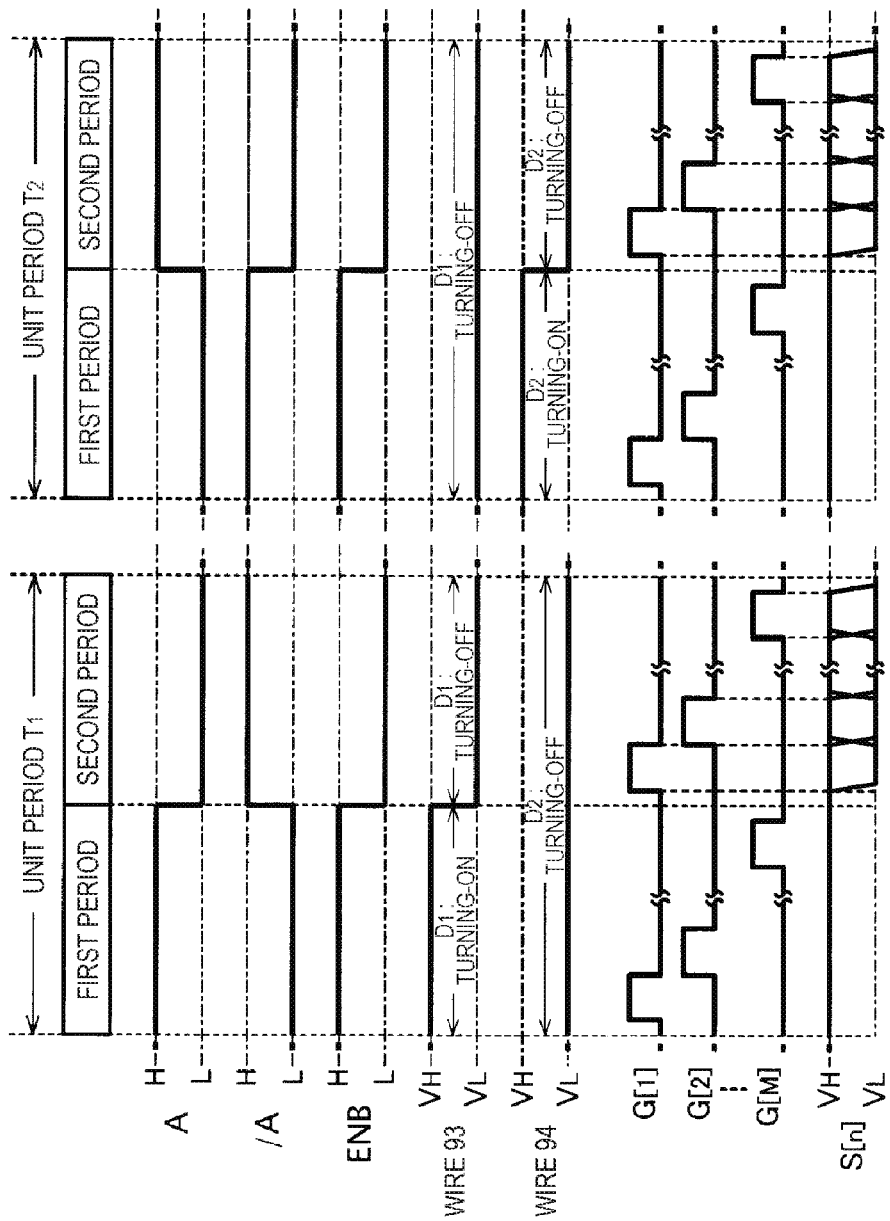
FIG. 8 is a timing chart illustrating an operation of the illumination portion.

FIG. 8 is a timing chart illustrating an operation of the illumination portion 20. Measurement operations which include imaging of the subject 200 and measurement of biological information using the result of the imaging are sequentially repeated a plurality of times (for example, five times per day). A single measurement operation is performed during a single unit period T (T1 and T2). The unit period T is started, for example, under an instruction from a user. FIG. 8 illustrates the successive unit periods T1 and T2 for descriptive purposes.

Each unit period T includes a first period and a second period. In the first period, one of the plurality of light-emitting elements D1 and the plurality of light-emitting elements D2 are selectively turned on, the entirety of the subject 200 is illuminated with light emitted by the plurality of light-emitting elements D1 or the plurality of light-emitting elements D2, and imaging light reflected from the subject 200 irradiated with the emitted light is imaged by the imaging portion 50. In the second period, the subject 200 is partially illuminated with light emitted by the light-emitting elements DP corresponding to a vein pattern specified in the first period from the result of the imaging among the plurality of light-emitting elements DP, and imaging light reflected from the subject 200 illuminated by the light-emitting elements DP is imaged by the imaging portion 50.

First Period

As illustrated in FIG. 8, in the first period of the period time T1, the control signal A supplied to the switching portion SW from the control device 14 is set to a high level (H), and the control signal /A is set to a low level (L). In addition, the enable signal ENB supplied from the control device 14 to the switching portion SW is set to a high level (H). Therefore, the voltage VH is output to the wire 93 from each of the AND circuits 71 of the switching portion SW, and the voltage VL is output to the wire 94 from each of the AND circuits 72. In the above-described state, since the voltage VH is supplied to each of the first electrodes E1 of the plurality of light-emitting elements D1 via the wire 93, the plurality of light-emitting elements D1 are simultaneously turned on. The subject 200 is illuminated with the illumination light emitted by the light-emitting elements D1 that are turned on. On the other hand, since the same voltage VL as that for the second electrodes E2 is supplied to the first electrode E1 of each of the light-emitting elements D2, each of the light-emitting elements D2 is not turned on. In this embodiment, as illustrated in FIG. 4, since the plurality of light-emitting element columns QD1 each in which the N light-emitting elements D1 are arranged and the plurality of light-emitting element columns QD2 are alternately arranged, it is possible to uniformly illuminate a wide range of the subject 200.

On the other hand, in the first period, the control device 14 controls the drive circuit 80 so that the plurality of light-emitting elements DP are maintained in the OFF state. For example, as illustrated in FIG. 8, the scanning line drive circuit 82 sequentially selects the M scanning lines 95 by sequentially setting the scanning signals G[1] to G[M] to a high level. On the other hand, the signal line drive circuit 84 supplies the drive signals S[1] to S[N] at the voltage VH in parallel under the control by the control device 14. When the scanning line drive circuit 82 selects the scanning line 95 in the m-th row, the transistors TSE of the N unit circuits K in the m-th row are transited to the ON state. Therefore, the voltage VH of the drive signal S[n] is supplied to the gate of the transistor TDR of each of the unit circuits K via the signal line 96 and the transistor TSE. Accordingly, the transistor TDR is maintained in the OFF state during the first period, current is blocked, and the light-emitting elements DP are turned off.

The imaging light reflected from the subject 200 illuminated by the light-emitting elements D1 is transmitted through the plurality of light-emitting elements D2 in the transmission region J, is converged by the lenses 34 of the converging portion 30, passes through the openings 46 of the light-shielding portion 40, and reaches the light-receiving elements 54. The light-receiving element 54 generates a detection signal according to the amount of received light. Since the illumination light (near-infrared light) emitted by the light-emitting elements D1 is absorbed by reduced hemoglobin in a vein, the amount of light received by each of the light-receiving elements 54 when the light-emitting elements D1 are turned on reflects the vein pattern of a finger of an object to be tested. The control device 14 acquires the detection signals generated by the light-receiving elements 54 corresponding to the respective light-emitting elements D2 and specifies the vein pattern of the subject 200 by performing image processing on each of the detection signals. Otherwise, it is also possible to analyze the vein pattern with an external device that is provided separately from the control device 14.

However, since the light-emitting elements D1 are provided in the transmission region J, while the illumination light emitted by the light-emitting elements D1 toward the subject 200 is used to illuminate the subject 200, the light emitted by the light-emitting elements D1 toward the side opposite to the subject 200 passes through the converging portion 30 and the light-shielding portion 40 and reaches the light-receiving element 54 without passing through the subject 200. Therefore, the charge quantity of the light-receiving element 54 corresponding to the light-emitting element D1 may be saturated. Therefore, in this embodiment, in the first period of the unit period T1 in which the plurality of light-emitting elements D1 are turned on, the light received by the light-receiving elements 54 corresponding to the light-emitting elements D2 (the transmission region J) is regarded as valid (that is, is used to analyze the vein pattern) as described above, and the light received by the light-receiving elements 54 corresponding to the light-emitting elements D1 is regarded as not valid. Specifically, a configuration in which the detection signals are not output from the light-receiving elements 54 corresponding to the light-emitting elements D1, or a configuration in which the detection signals output from the corresponding light-receiving elements 54 are ignored (not used to analyze the vein pattern) may be employed.

On the other hand, as illustrated in FIG. 8, in the first period of the unit period T2 which is separate from the unit period T1, the levels of the control signals A and /A are inverted compared to the first period of the unit period T1. That is, the control signal A is set to the low level (L), and the control signal /A is set to the high level (H). In addition, the enable signal ENB is set to the high level (H) as in the first period of the unit period T1. Therefore, the voltage VH is output to the wire 94 from each of the AND circuits 72 of the switching portion SW, and the voltage VL is output to the wire 93 from each of the AND circuits 71. In the above-described state, since the voltage VH is supplied to each of the first electrodes E1 of the plurality of light-emitting elements D2 via the wire 94, the plurality of light-emitting elements D2 are simultaneously turned on. The subject 200 is illuminated with the illumination light emitted by the light-emitting elements D2 that are turned on. On the other hand, since the same voltage VL as that for the second electrodes E2 is supplied to the first electrode E1 of each of the light-emitting elements D1, each of the light-emitting elements D1 is not turned on.

In the first period of the unit period T2, as in the first period of the unit period T1, the control device 14 controls the drive circuit 80 so that the plurality of light-emitting elements DP are maintained in the OFF state. As described above, in the first period in which the light-emitting elements DP are turned off, the plurality of light-emitting elements D1 and the plurality of light-emitting elements D2 are selectively turned on. In addition, it is possible to turn off the plurality of light-emitting elements DP by stopping the operation of the drive circuit 80 (selection of the scanning line 95 or supply of the drive signal S[n]) in the first period of each of the unit periods T1 and T2. In addition, in the above description, a case where the operation of turning on the light-emitting elements D1 or the light-emitting elements D2 and the operation of turning off the light-emitting elements DP are performed in parallel is described. However, the operation of turning off the light-emitting elements DP before the first period of each of the unit periods T1 and T2 may be performed, and the light-emitting elements D1 or the light-emitting elements D2 may be turned on while the OFF state of the light-emitting elements DP is maintained in the corresponding first period.

The imaging light reflected from the subject 200 illuminated by the light-emitting elements D2 passes through the plurality of light-emitting elements D1 in the transmission region J, the lenses 34 of the converging portion 30, and the openings 46 of the light-shielding portion 40, and reaches the light-receiving elements 54. The control device 14 specifies the vein pattern of the subject 200 by performing image processing on the detection signal generated by the light-receiving element 54 corresponding to each of the light-emitting elements D1. In the first period of the unit period T2, the charge quantity of the light-receiving element 54 corresponding to the light-emitting element D2 may be saturated. Therefore, the light received by the light-receiving elements 54 corresponding to the light-emitting elements D1 (the transmission region J) is regarded as valid (that is, is used to analyze the vein pattern) as described above, and the light received by the light-receiving elements 54 corresponding to the light-emitting elements D2 is regarded as not valid.

Second Period

As illustrated in FIG. 8, in the second period of each of the unit periods T1 and T2, the enable signal ENB is set to the low level. Therefore, the outputs of both of the AND circuits 71 and the AND circuits 72 of the switching portion SW are set to the voltage VL. That is, in the second period, the voltage VL (second voltage) is supplied to both of the wire 93 and the wire 94. Therefore, in the second period, both of the plurality of light-emitting elements D1 and the plurality of light-emitting elements D2 are turned off. In FIG. 8, the level of the control signal A is inverted between the second period of the unit period T1 and the second period of the unit period T2. However, the outputs of both of the AND circuits 71 and the AND circuits 72 are set to the voltage VL by the enable signal ENB in the low level, regardless of the levels of the control signal A and the control signal /A. Therefore, the levels of the control signal A and the control signal /A in the second period are arbitrary. As understood from the above description, the switching portion SW supplies the voltage VH (first voltage) to one of the wire 93 (third wire) and the wire 94 (fourth wire) and supplies the voltage VL (second voltage) to the other of the wire 93 and the wire 94 in the first period, and supplies the voltage VL to both of the wire 93 and the wire 94 in the second period.

In addition, in the second period, the control device 14 controls the drive circuit 80 so that the light-emitting elements DP (for example, the light-emitting elements DP in the vicinity of the vein pattern) at positions corresponding to the vein pattern specified in the first period among the plurality of light-emitting elements DP of the light-emitting element section W are turned on. Specifically, as illustrated in FIG. 8, the scanning line drive circuit 82 sequentially selects the M scanning lines 95 by sequentially setting the scanning signals G[1] to G[M] to the high level. On the other hand, the signal line drive circuit 84 supplies the drive signals S[1] to S[N] to the N signal lines 96 under the control by the control device 14 in parallel. As illustrated in FIG. 8, the drive signals S[1] to S[N] are set to any of the voltage VH and the voltage VL. Specifically, the voltage of the drive signal S[n] in a period in which the scanning line 95 in the m-th row is selected is set to the voltage VL in a case where the light-emitting element DP positioned in the m-th row and n-th column is to be turned on (that is, in a case of the light-emitting element DP in the vicinity of the vein pattern), and is set to the voltage VH in a case where the light-emitting element DP is to be turned off.

When the scanning line drive circuit 82 selects the scanning line 95 in the m-th row, the transistors TSE of the N unit circuits K in the m-th row are transited to the ON state. When the transistors TSE are transited to the ON state, the drive signal S[n] is supplied to the gate of the transistor TDR of each of the unit circuits K via the signal line 96 and the transistor TSE, and the voltage of the gate of the transistor TDR is held in the storage capacitor CP.

When the transistor TDR is transited to the ON state as the drive signal S[n] at the voltage VL is supplied, current flows on a path from the wire 91 to the wire 92 via the transistor TDR and the light-emitting element DP, such that the light-emitting element DP is turned on. On the other hand, when the transistor TDR is transited to the OFF state as the drive signal S[n] at the voltage VH is supplied, current does not flow through the transistor TDR or the light-emitting element DP, such that the light-emitting element DP is turned off. That is, among the plurality of light-emitting elements DP of the light-emitting element section W, the light-emitting elements DP corresponding to the vein pattern are turned on, and the remaining light-emitting elements DP are turned off. In addition, it is also possible to repeat an operation of sequentially selecting the M scanning line 95 and supplying th drive signal S[n] to each of the unit circuits K, a plurality of times within the second period.

The imaging light reflected from the subject 200 illuminated by the light-emitting elements DP is transmitted through the plurality of light-emitting elements D1 (the transmission region J) and the light-emitting elements D2 (the transmission region J), is converged by the lenses 34 of the converging portion 30, passes through the openings 46 of the light-shielding portion 40, and reaches the light-receiving elements 54. In the second period, the detection signals of both of the light-receiving elements 54 corresponding to the light-emitting elements D1 and the light-receiving elements corresponding to the light-emitting elements D2 are availably supplied to the control device 14. The control device 14 generates biological information such as an oxygen saturation degree or blood sugar level by analyzing the detection signal acquired from each of the light-receiving elements 54 in the second period. In the second period, since the light-emitting elements DP corresponding to the vein pattern are selectively turned on, it is possible to generate the detection signals with a high S/N ratio.

As understood from the above description, in the first period of the unit period T1, the plurality of light-emitting elements D1 are simultaneously turned on as the voltage VH is supplied to the wire 93, and the plurality of light-emitting elements D2 are turned off as the voltage VL is supplied to the wire 94. On the other hand, in the first period of the unit period T2, the plurality of light-emitting elements D1 are turned off as the voltage VL is supplied to the wire 93, and the plurality of light-emitting elements D2 are simultaneously turned on as the voltage VH is supplied to the fourth wire. That is, turning-on and turning-off of the plurality of light-emitting elements D1 are simultaneously controlled, and turning-on and turning-off of the plurality of light-emitting elements D2 are also simultaneously controlled. On the other hand, in the second period, turning-on and turning-off of each of the plurality of light-emitting elements DP are individually controlled by controlling the drive signal S[n]

supplied to each of the signal lines 96 to any of the voltage VL and the voltage VH. The light-emitting elements D1 in which turning-on and turning-off are simultaneously controlled and the light-emitting elements D2 in which turning-on and turning-off are simultaneously controlled may be expressed as "simultaneous light-emitting elements". On the other hand, the light-emitting elements DP in which turning-on and turning-off are individually controlled may be expressed as "individual light-emitting elements".

As described above, in the first period, the plurality of light-emitting elements D1 or the plurality of light-emitting elements D2 in which turning-on and turning-off are simultaneously controlled are turned on to illuminate a fixed region of the subject 200 (for example, the entirety of the subject 200), and in the second period, the plurality of light-emitting elements DP are individually turned on or turned off to illuminate a variable region of the subject 200 (portions corresponding to the vein pattern). In the above-described configuration, compared to a configuration in which the plurality of light-emitting elements DP are used to illuminate both of the fixed region and the variable region of the subject 200, the time for which the light-emitting elements DP are turned on is reduced, and thus there is an advantage that the deterioration of the light-emitting elements DP with time can be suppressed.

In addition, in the above-described configuration, the plurality of light-emitting elements D1 and the plurality of light-emitting elements D2 are selectively turned on. Specifically, as described above, the plurality of light-emitting elements D1 are turned on in one unit period T1 of the successive two unit periods, and the plurality of light-emitting elements D2 are turned on in the other unit period T2. Therefore, compared to a configuration in which only one of the plurality of light-emitting elements D1 and the plurality of light-emitting elements D2 are used to illuminate the subject 200 in the first period, there is also an advantage that the deterioration of the light-emitting elements D1 and the light-emitting elements D2 can be suppressed.

In the above-described configuration, since the plurality of light-emitting elements D1 and the plurality of light-emitting elements D2 are formed in the transmission region J, compared to a configuration in which the light-emitting elements D1 and the light-emitting elements D2 are formed only in the non-transmission region P, it is possible to illuminate a wide range of the subject 200. In addition, since the plurality of light-emitting elements D1 and the plurality of light-emitting elements D2 provided in the transmission region J have light-transmitting properties, in the second period in which the plurality of light-emitting elements DP are turned on, the imaging light is transmitted through both of the transmission region J in which the light-emitting elements D1 are disposed and the transmission region J in which the light-emitting elements D2 are disposed, and reaches the light-receiving elements 54. Therefore, compared to a configuration in which the plurality of light-emitting elements D1 and the plurality of light-emitting elements D2 are provided in the non-transmission region P, there is an advantage that the amount of light that reaches the imaging portion 50 when the light-emitting elements DP are turned on can be sufficiently ensured. In addition, in the above-described configuration, in the first period in which the plurality of light-emitting elements D1 are turned on, the imaging light is transmitted through the transmission region J in which the light-emitting elements D2 are disposed and reaches the light-receiving elements 54, and in the first period in which the plurality of light-emitting elements D2 are turned on, the imaging light is transmitted through the transmission region J in which the light-emitting elements D1 are disposed and reaches the light-receiving elements 54. Therefore, compared to a configuration in which one of the plurality of light-emitting elements D1 and the plurality of light-emitting elements D2 are provided in the non-transmission region P, there is an advantage that the amount of light that reaches the imaging portion 50 when the light-emitting elements D (D1 and D2) are turned on can be sufficiently ensured.

As illustrated in FIG. 7, the light-emitting layer 27 and the second electrode E2 included in the light-emitting element DP are continuously formed across the light-emitting elements D1 and the light-emitting elements D2, and are also used as the light-emitting layer 27 and the second electrode E2 in each of the light-emitting elements D1 and the light-emitting elements D2. In the above-described configuration, compared to a configuration in which the light-emitting layer 27 or the second electrode E2 is individually formed in each of the light-emitting elements DP, the light-emitting elements D1, and the light-emitting elements D2, the configuration of the illumination portion 20 can be simplified.

As illustrated in FIG. 4, the plurality of light-emitting element columns QD1 which each include two or more light-emitting elements D1 arranged along the Y direction and the plurality of light-emitting element columns QD2 which each include two or more light-emitting elements D2 arranged along the Y direction are periodically arranged along the X direction. Therefore, compared to a configuration in which at least one of the plurality of light-emitting elements D1 and the plurality of light-emitting elements D2 are present only in a specific region of the light-emitting element section W, it is possible to uniformly illuminate a wide range of the subject 200. In this embodiment, particularly, since the light-emitting element columns QD1 and the light-emitting element columns QD2 are alternately arranged along the X direction, the effect of uniformly illuminating a wide range of the subject 200 is significantly exhibited.

The voltage VH of the wire 91 and the voltage VL of the wire 92 are used to drive the light-emitting elements DP, the light-emitting elements D1 are driven as the voltage VH or the voltage VL is supplied to the wire 93, and the light-emitting elements D2 are driven as the voltage VH or the voltage VL is supplied to the wire 94. That is, the voltage VH and the voltage VL used to control the plurality of light-emitting elements DP are also used to control the plurality of light-emitting elements D1 and the plurality of light-emitting elements D2. Therefore, compared to a configuration in which the light-emitting elements D1 and the light-emitting elements D2 are controlled by a voltage that is different from the voltage for controlling the light-emitting elements DP, there is an advantage that the configurations of the circuit (the voltage generation circuit 86) that generates a voltage and the wire that supplies the voltage to each of corresponding elements are simplified. In addition, turning-on and turning-off of the plurality of light-emitting elements D1 are simultaneously controlled by controlling the voltage (switching between the voltage VH/the voltage VL) of the wire 93 to which the plurality of light-emitting elements D1 are simultaneously connected, and turning-on and turning-off of the plurality of light-emitting elements D2 are simultaneously controlled by controlling the voltage (switching between the voltage VH/the voltage VL) of the wire 94 to which the plurality of light-emitting elements D2 are simultaneously connected. Therefore, for example, compared to a configuration in which the light-emitting elements D1 are connected to individual wires or a configuration in which the light-emitting elements D2 are connected to individual wires, there is an advantage that the plurality of light-emitting elements D1 and the plurality of light-emitting elements D2 can be simultaneously controlled with a simpler configuration.

Modification Example

The above-described embodiment can be modified in various manners. Specific modification examples are described below. Two or more examples arbitrarily selected from the following description may be appropriately combined in a range in which there is no contradiction therebetween.

Figure 9:
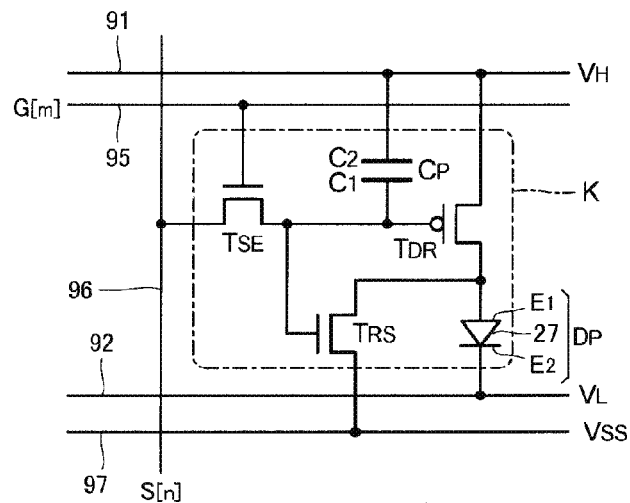
FIG. 9 is a circuit diagram of a unit circuit according to a modification example.

(1) The configuration of the unit circuit K is not limited to the illustration of FIG. 6. For example, as illustrated in FIG. 9, it is possible to provide a transistor TRS between the first electrode E1 of the light-emitting element DP and a wire 97 to which a voltage VSS is supplied. The voltage VSS is a voltage lower than the voltage VL (for example, ground voltage). The gate of the transistor TRS is connected to the gate of the transistor TDR. In a case where the drive signal S[n] is set to the voltage VL when the scanning line 95 in the m-th row is selected, the transistor TRS is maintained in the OFF state. Therefore, the light-emitting element DP is turned on as in the above-described embodiment. On the other hand, when the drive signal S[n] is set to the voltage VH when the scanning line 95 is selected, the transistor TRS is controlled to be in the ON state, and the voltage VSS of the wire 97 is supplied to the first electrode E1 of the light-emitting element DP via the transistor TRS. Therefore, it is possible to reliably turn off the light-emitting element DP.

(2) In the above-described embodiment, the plurality of simultaneous light-emitting elements are divided into the plurality of light-emitting elements D1 and the plurality of light-emitting elements D2 to be selectively turned on. However, the number of divided groups of the plurality of simultaneous light-emitting elements is not limited to the above description. For example, it is possible to divide the plurality of simultaneous light-emitting elements into the plurality of light-emitting elements D1, the plurality of light-emitting elements D2, and a plurality of light-emitting elements D3 to be selectively turned on.

Figure 10:
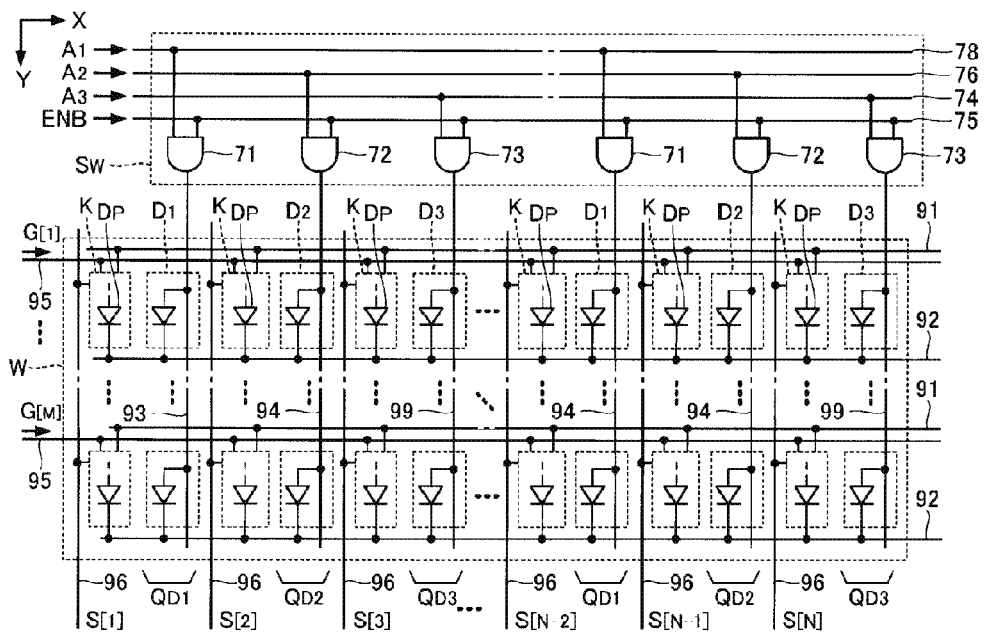
FIG. 10 is an electrical configuration diagram of the illumination portion according to the modification example.

FIG. 10 is an electrical configuration diagram of the illumination portion 20 according to the modification example. The plurality of simultaneous light-emitting elements formed in the light-emitting element section W together with the plurality of light-emitting elements DP are divided into plurality of light-emitting elements D1, the plurality of light-emitting elements D2, and the plurality of light-emitting elements D3. Similar to the light-emitting element D1 and the light-emitting element D2, the light-emitting element D3 has a configuration in which the light-emitting layer 27 is interposed between the first electrode E1 (cathode) and the second electrode E2 (anode). The plurality of light-emitting elements D3 are divided into a plurality of light-emitting element columns QD3 which are arranged in the Y direction and each include M light-emitting elements as a unit. The light-emitting element columns QD1, the light-emitting element columns QD2, and the light-emitting element columns QD3 are periodically arranged in the X direction that intersects the Y direction. The first electrodes E1 of the M light-emitting elements D3 that belong to a single light-emitting element column QD3 are simultaneously connected to a wire 99 corresponding to the light-emitting element column QD3. On the other hand, the second electrodes E2 of the plurality of light-emitting elements D3 are simultaneously connected to the wire 92.

In the switching portion SW, in addition to each of the elements of the switching portion SW of the embodiment, a wire 74 and AND circuits 73 are added. A control signal A1 is supplied from the control device 14 to the wire 78, a control signal A2 is supplied from the control device 14 to the wire 76, and a control signal A3 is supplied from the control device 14 to the wire 74. The control signal A1, the control signal A2, and the control signal A3 are set to any of the voltage VH and the voltage VL. The AND circuit 73 outputs a logic signal of the control signal A3 supplied to the wire 74 and the enable signal ENB to the wire 99.

In the above-described configuration, the switching portion SW selectively turns on the plurality of light-emitting elements D1, the plurality of light-emitting elements D2, and the plurality of light-emitting elements D3 in the first period of the unit period T1, the first period of the unit period T2, and the first period of the unit period T3. Specifically, the plurality of light-emitting elements D1 are turned on in the first period of the unit period T1 while the plurality of light-emitting elements D2 and the plurality of light-emitting elements D3 are turned off, the plurality of light-emitting elements D2 are turned on in the first period of the unit period T2 while the plurality of light-emitting elements D1 and the plurality of light-emitting elements D3 are turned off, and the plurality of light-emitting elements D3 are turned on in the first period of the unit period T3 while the plurality of light-emitting elements D1 and the plurality of light-emitting elements D2 are turned off.

In FIG. 10, the plurality of simultaneous light-emitting elements are divided into three groups (D1, D2, and D3), but the number of divided groups of the plurality of simultaneous light-emitting elements is arbitrary. Regardless of the number of divided groups of the simultaneous light-emitting elements, an appropriate example of the invention is comprehensively expressed as, in a case of focusing on the plurality of light-emitting elements D1 (D2) in which turning-on and turning-off are simultaneously controlled and the plurality of light-emitting elements DP in which turning-on and turning-off are simultaneously controlled, a configuration in which the plurality of light-emitting elements D1 and the plurality of light-emitting elements D2 are selectively turned on. That is, the presence or absence of the simultaneous light-emitting elements (for example, the light-emitting elements D3 in FIG. 10) other than the plurality of first light-emitting elements D1 and the plurality of second light-emitting elements D2 and whether to turn on or off the corresponding simultaneous light-emitting elements do not need to be considered.

Figure 11:
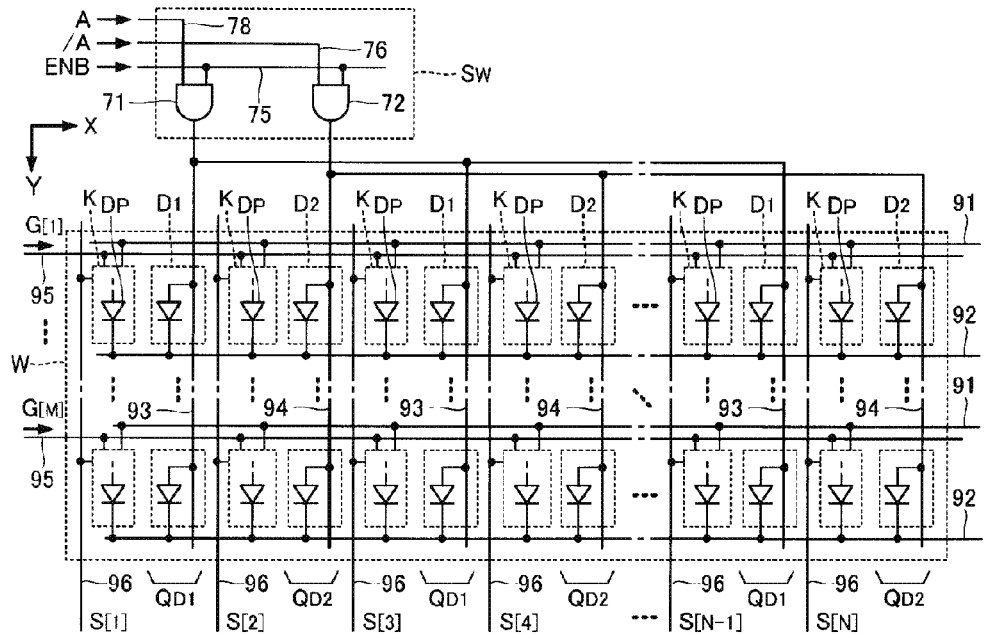
FIG. 11 is an electrical configuration diagram of the illumination portion according to the modification example.
Figure 12:
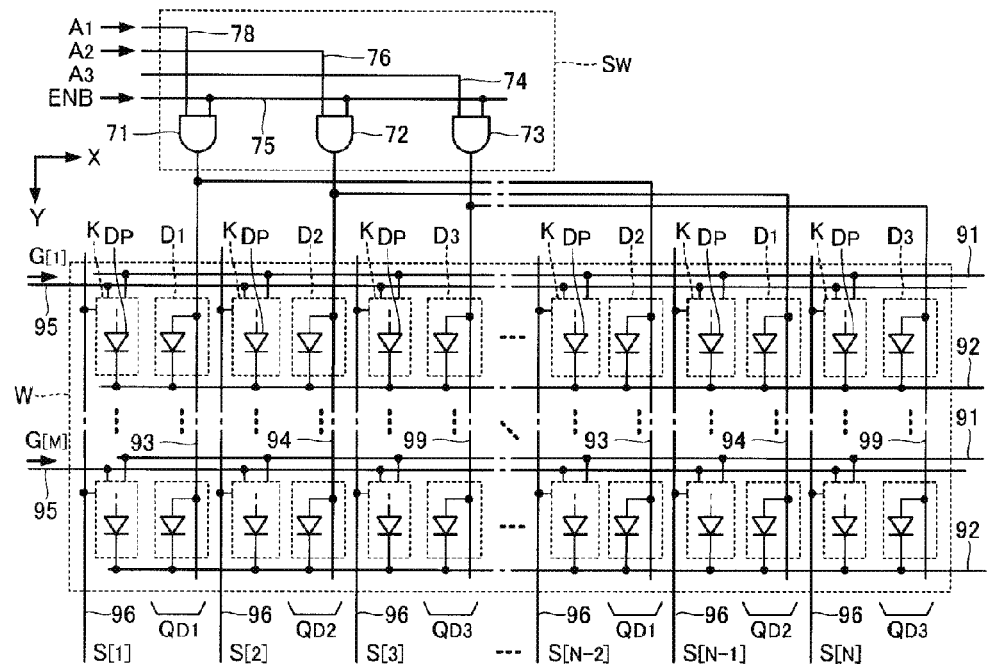
FIG. 12 is an electrical configuration diagram of the illumination portion according to the modification example.

(3) In the above-described embodiment, the configuration in which the AND circuit 71 is provided for each of the wires 93 (for each of the light-emitting element columns QD1) and the AND circuit 72 is provided for each of the wires 94 (for each of the light-emitting element columns QD2) is described. However, for example, as illustrated in FIG. 11, it is possible to allow a single AND circuit 71 to be shared by the plurality of wires 93, and a single AND circuit 72 may be shared by the plurality of wires 94. Specifically, as illustrated in FIG. 11, the single AND circuit 71 and the single AND circuit 72 are provided in the switching portion SW. The plurality of wires 93 corresponding to the different light-emitting element columns QD1 are simultaneously connected to the output end of the single AND circuit 71, and the plurality of wires 94 corresponding to the different light-emitting element columns QD2 are simultaneously connected to the output end of the single AND circuit 72. Even in the configuration of FIG. 11, it is possible to selectively turn on the plurality of light-emitting elements D1 and the plurality of light-emitting elements D2. In addition, as illustrated in FIG. 12, in a configuration provided with the light-emitting elements D3 in addition to the light-emitting elements D1 and the light-emitting elements D2, a configuration in which a single AND circuit 73 is shared by the plurality of light-emitting element columns QD3 is employed.

(4) In the above-described embodiment, a configuration in which the light-emitting elements D1 and the light-emitting elements D2 emit near-infrared light is described. However, for example, by changing the film thickness of the optical path adjustment layer 25 between the light-emitting element D1 and the light-emitting element D2, the wavelengths of the light emitted by the light-emitting element D1 and the light-emitting element D2 may be changed.

(5) In the above-described embodiment, a configuration in which the switching portion SW is provided with the AND circuit 71 and the AND circuit 72 is described. However, the configuration of the switching portion SW is arbitrary. That is, an arbitrary element for selectively turning on the plurality of light-emitting elements D1 and the plurality of light-emitting elements D2 is employed as the switching portion SW.

(6) In the above-described embodiment, turning on of the light-emitting elements D1 and turning on of the light-emitting elements D2 are switched every measurement operation during the first period. However, for example, it is possible to switch between turning on of the light-emitting elements D1 and turning on of the light-emitting elements D2 every a plurality of measurement operations.

(7) Biological information that can be measured by the biological information generation device 100 is not limited to information (an oxygen saturation degree or blood sugar level) described in the above-described embodiment. For example, it is possible to use the biological information generation device 100 according to the above-described embodiment to measure biological information such as an alcohol concentration or cholesterol level in the blood in a vein.

The entire disclosure of Japanese Patent Application No. 2015-110232, filed May 29, 2015, is hereby incorporated herein by reference.

What is claimed is:

1. An imaging device comprising:
an illumination portion which includes a light-transmitting transmission region and a light-shielding non-transmission region, has a plurality of simultaneous light-emitting elements that have a light-transmitting property, include a plurality of first light-emitting elements in which turning-on and turning-off are simultaneously controlled and a plurality of second light-emitting elements in which turning-on and turning-off are simultaneously controlled, and are provided in the transmission region, and has a plurality of individual light-emitting elements in which turning-on and turning-off are individually controlled and which are provided in the non-transmission region;
an imaging portion which receives light that is reflected from a subject illuminated by the illumination portion and is transmitted through the transmission region; and
a switching portion which selectively turns on the plurality of first light-emitting elements and the plurality of second light-emitting elements in a first period in which the plurality of individual light-emitting elements are turned off, and turns off the plurality of simultaneous light-emitting elements in a second period in which the plurality of individual light-emitting elements are turned on.

2. The imaging device according to claim 1,
wherein the individual light-emitting element is formed by laminating a first electrode, a light-emitting layer, and a second electrode, and
the light-emitting layer and the second electrode are continuous across the first light-emitting elements and the second light-emitting elements.

3. The imaging device according to claim 1,
wherein the plurality of first light-emitting elements are divided into a plurality of first light-emitting element columns which are arranged in a first direction and each include two or more first light-emitting elements,
the plurality of second light-emitting elements are divided into a plurality of second light-emitting element columns which are arranged in the first direction and each include two or more second light-emitting elements, and
the plurality of first light-emitting element columns and the plurality of second light-emitting element columns are periodically arranged in a second direction that intersects the first direction.

4. The imaging device according to claim 3,
wherein each of the plurality of first light-emitting element columns and each of the plurality of second light-emitting element columns are alternately arranged along the second direction.

5. The imaging device according to claim 1,
wherein each of the plurality of individual light-emitting elements is disposed between a first wire, to which a first voltage is supplied, and a second wire, to which a second voltage different from the first voltage is supplied,
each of the plurality of first light-emitting elements is disposed between the second wire and a third wire,
each of the plurality of second light-emitting elements is disposed between the second wire and a fourth wire, and
the switching portion supplies the first voltage to one of the third wire and the fourth wire and supplies the second voltage to the other of the third wire and the fourth wire in the first period, and supplies the second voltage to the third wire and the fourth wire in the second period.

6. The imaging device according to claim 5,
wherein a transistor, which controls current to be supplied to the individual light-emitting element, and the individual light-emitting element are connected in series between the first wire and the second wire,
each of the plurality of first light-emitting elements is connected to the second wire and the third wire, and
each of the plurality of second light-emitting elements is connected to the second wire and the fourth wire.

7. A controlling method of an imaging device,
wherein the imaging device includes
an illumination portion which includes a light-transmitting transmission region and a light-shielding non-transmission region, has a plurality of simultaneous light-emitting elements that have a light-transmitting property, include a plurality of first light-emitting elements in which turning-on and turning-off are simultaneously controlled and a plurality of second light-emitting elements in which turning-on and turning-off are simultaneously controlled, and are provided in the transmission region, and has a plurality of individual light-emitting elements in which turning-on and turning-off are individually controlled and which are provided in the non-transmission region, and an imaging portion which receives light that is reflected from a subject illuminated by the illumination portion and is transmitted through the transmission region, and the method comprising:

selectively turning on the plurality of first light-emitting elements and the plurality of second light-emitting elements in a first period in which the plurality of individual light-emitting elements are turned off, and turning off the plurality of simultaneous light-emitting elements in a second period in which the plurality of individual light-emitting elements are turned on.

8. The controlling method of an imaging device according to claim 7, wherein a unit period including the first period and the second period is repeated a plurality of times, and the plurality of first light-emitting elements are turned on in the first period of one unit period of two successive unit periods, and the plurality of second light-emitting elements are turned on in the first period of the other unit period.

9. The controlling method of an imaging device according to claim 7, wherein, in the second period, one or more individual light-emitting elements selected from among the plurality of individual light-emitting elements according to the result of the imaging by the imaging portion in the first period are turned on, and the remaining individual light-emitting elements are turned off.

10. The controlling method of an imaging device according to claim 7, wherein the imaging portion includes a plurality of light-receiving elements which overlap the transmission region in a plan view, and in the first period in which the plurality of first light-emitting elements are turned on, light received by the light-receiving elements respectively corresponding to the plurality of second light-emitting elements is regarded as valid and light received by the light-receiving elements respectively corresponding to the plurality of first light-emitting elements is regarded as not valid, and in the first period in which the plurality of second light-emitting elements are turned on, light received by the light-receiving elements respectively corresponding to the plurality of first light-emitting elements is regarded as valid and light received by the light-receiving elements respectively corresponding to the plurality of second light-emitting elements is regarded as not valid.

* * * * *